(12) United States Patent
Vicentelli

(10) Patent No.: US 11,617,964 B2
(45) Date of Patent: Apr. 4, 2023

(54) MAGNETIC MODULE WITH MAGNETICALLY ACTIVATABLE AND DEACTIVATABLE ANCHORING SURFACES

(71) Applicant: Claudio Vicentelli, Alghero (IT)

(72) Inventor: Claudio Vicentelli, Alghero (IT)

( * ) Notice: Subject to any disclaimer, the term of this patent is extended or adjusted under 35 U.S.C. 154(b) by 220 days.

(21) Appl. No.: 16/973,989

(22) PCT Filed: Jun. 10, 2019

(86) PCT No.: PCT/IB2019/054800
§ 371 (c)(1),
(2) Date: Dec. 10, 2020

(87) PCT Pub. No.: WO2019/239276
PCT Pub. Date: Dec. 19, 2019

(65) Prior Publication Data
US 2021/0252419 A1 Aug. 19, 2021

(30) Foreign Application Priority Data

Jun. 11, 2018 (IT) .......................... 102018000006207

(51) Int. Cl.
*A63H 33/04* (2006.01)
*A63H 33/26* (2006.01)
*H02K 1/27* (2022.01)

(52) U.S. Cl.
CPC ............. *A63H 33/046* (2013.01); *H02K 1/27* (2013.01)

(58) Field of Classification Search
CPC ........... A63H 33/046; H02K 1/27; H01F 7/04
(Continued)

(56) References Cited

U.S. PATENT DOCUMENTS 3,288,511 A * 11/1966 Tavano ................... E05C 19/16
  16/87 R
4,250,478 A * 2/1981 Cardone ................... H01F 7/04
  335/295
(Continued)

FOREIGN PATENT DOCUMENTS

DE   2337887      2/1975
DE   3910304 A1  10/1990
(Continued)

*Primary Examiner* — Alexander R Niconovich
(74) *Attorney, Agent, or Firm* — Laubscher & Laubscher PC

(57) ABSTRACT

A magnetic module with two front anchoring surfaces magnetically activatable and deactivatable by inversion of the magnetic flux; the module comprises a first and a second fixed magnetic core, each one configured with a plurality of polar elements defining a respective front anchoring surface, and a rear surface, as well as provided with a first plurality of permanent magnets arranged between contiguous polar elements, wherein homonymous poles (N, S) of the permanent magnets are in contact with lateral faces of the single polar elements, to generate alternatively induced poles of opposite polarity in each fixed magnetic core. A movable magnetic unit for an inversion of the magnetic flux is disposed between the two fixed magnetic cores, and it is configured with a second plurality of permanent magnets having poles (N, S) alternatively of opposite polarities facing the rear surface of the two fixed magnetic cores; the movable magnetic unit can be moved between a first and a second operative position for the inversion of the magnetic flux, to magnetically activate and respectively deactivate one or both the front surfaces of the anchoring module.

21 Claims, 9 Drawing Sheets

(58) Field of Classification Search
USPC .......................................................... 446/92
See application file for complete search history.

(56) References Cited

U.S. PATENT DOCUMENTS

| | | | | |
|---|---|---|---|---|
| 4,314,219 | A * | 2/1982 | Haraguchi | H01F 7/04 335/295 |
| 4,465,993 | A * | 8/1984 | Braillon | B66C 1/04 335/287 |
| 5,345,207 | A * | 9/1994 | Gebele | H01J 37/3408 335/211 |
| 6,707,360 | B2 * | 3/2004 | Underwood | B23Q 3/1546 269/8 |
| 6,963,261 | B2 * | 11/2005 | Vicentelli | H01F 7/0252 335/295 |
| 7,834,729 | B2 * | 11/2010 | Fullerton | G01D 15/00 24/303 |
| 7,963,818 | B2 * | 6/2011 | Fullerton | A63H 33/046 446/93 |
| 8,350,663 | B1 * | 1/2013 | Michael | B23Q 3/1546 338/288 |
| 8,368,494 | B2 * | 2/2013 | Fiedler | B62J 11/00 269/8 |
| 8,851,953 | B2 * | 10/2014 | Oschuetz | A63H 33/042 446/124 |
| 10,173,292 | B2 * | 1/2019 | Fullerton | B23P 15/001 |
| 2002/0105400 | A1 | 8/2002 | Underwood et al. | |
| 2013/0109267 | A1 * | 5/2013 | Schweikardt | A63H 33/042 446/85 |
| 2013/0320686 | A1 * | 12/2013 | Morton | B66C 1/04 294/65.5 |

FOREIGN PATENT DOCUMENTS

| | | |
|---|---|---|
| EP | 1080476 B1 | 11/2004 |
| GB | 2211356 A | 6/1989 |
| WO | 03003388 A1 | 1/2003 |

\* cited by examiner

FIG.1
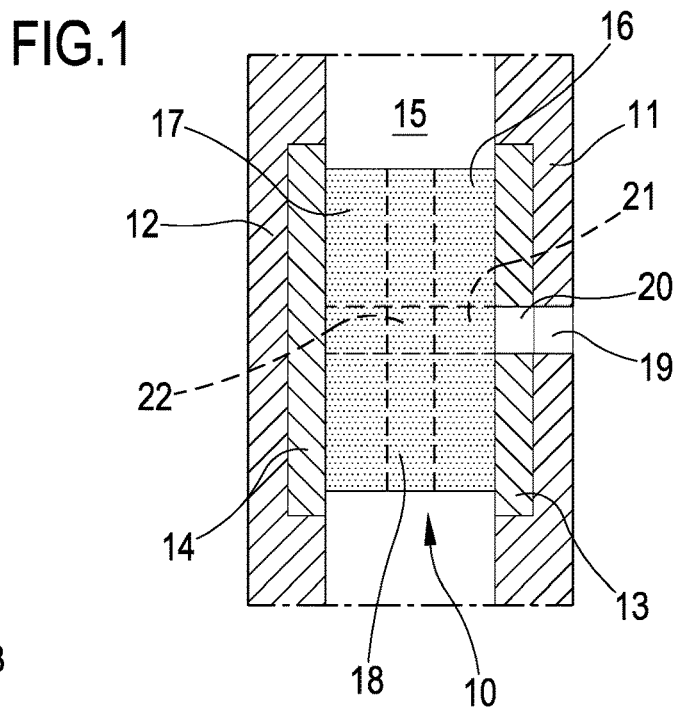
FIG.3
FIG.2
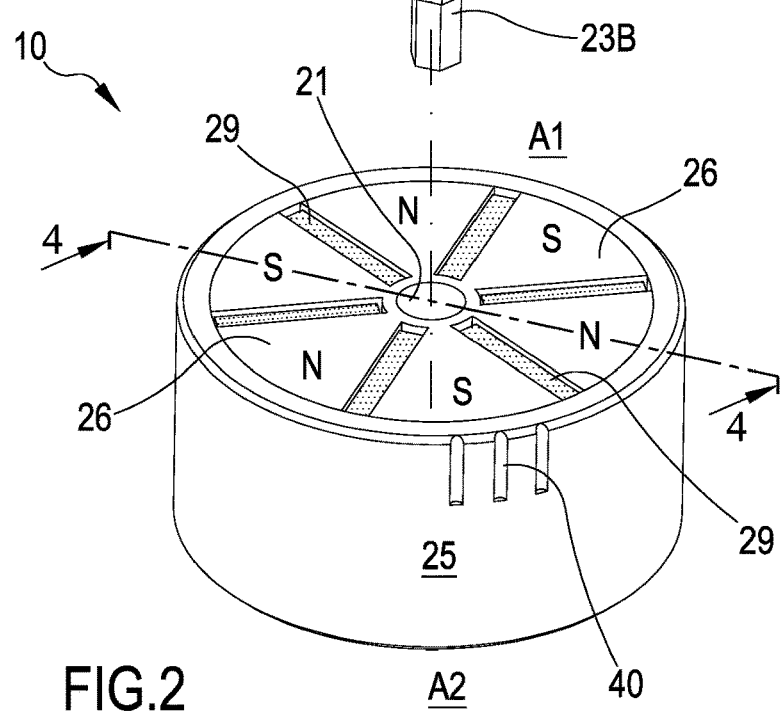

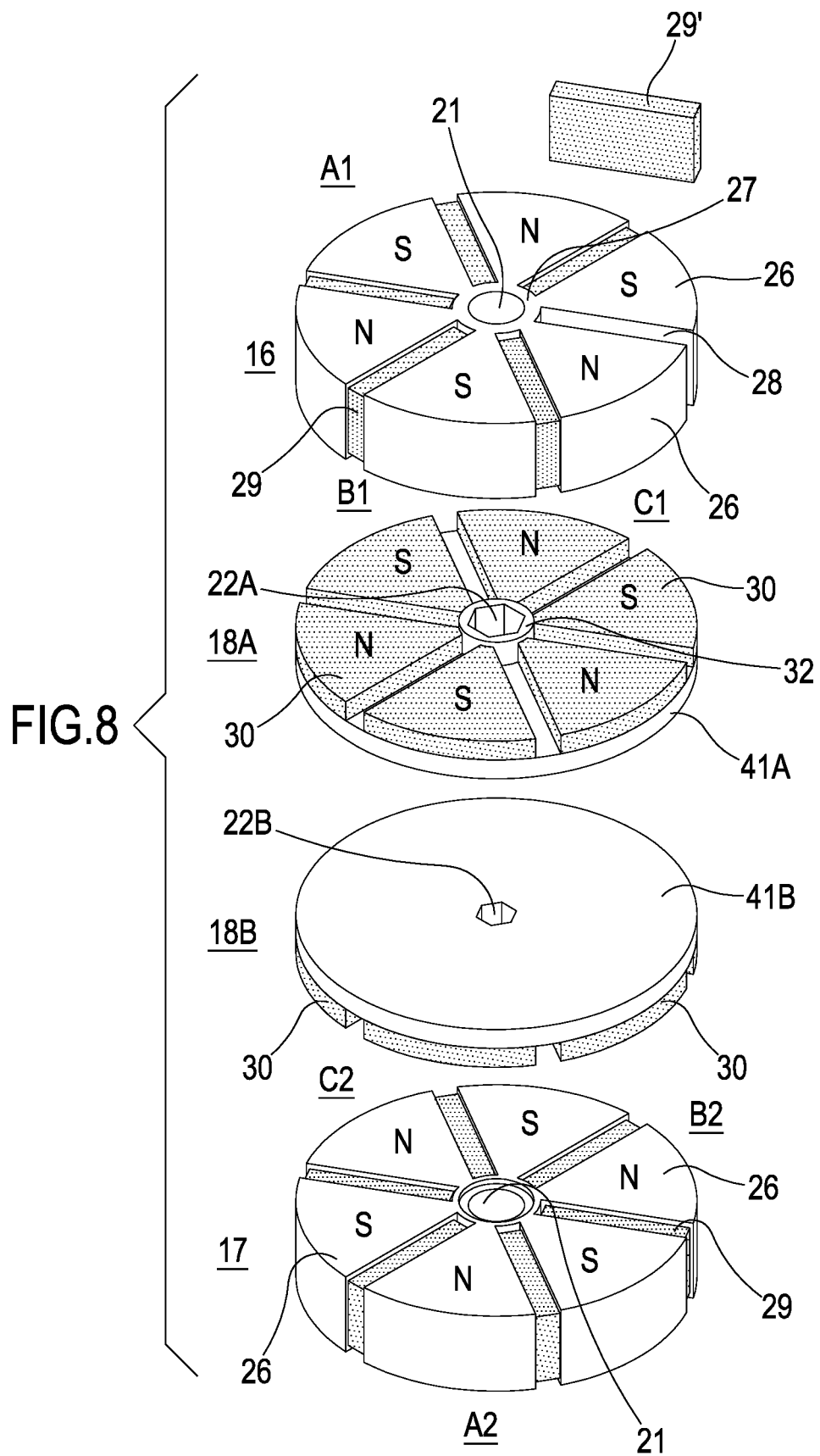

MAGNETIC MODULE WITH MAGNETICALLY ACTIVATABLE AND DEACTIVATABLE ANCHORING SURFACES

This application is a § 371 National Stage Entry of International Patent Application No. PCT/IB2019/054800 filed Jun. 10, 2019. Application No. PCT/IB2019/054800 claims priority of IT102018000006207 filed Jun. 11, 2018. The entire content of these applications is incorporated herein by reference.

TECHNICAL FIELD

The present invention refers to a magnetic module for anchoring ferromagnetic workpieces of an assembly, having two opposite anchoring faces capable of being magnetically activated and deactivated by means of an inversion of the magnetic flux inside the anchoring module.

STATE OF THE ART

Magnetic modules capable of connecting separate ferromagnetic workpieces, or constituting a part of an assembly, are widely known in the field of magnetic toys or for other uses. Magnetic modules of the above mentioned type are known for example from DE3910304 and from EP1080476; in particular EP1080476 describes an assembly resulting from the combination of magnetic modules and ferromagnetic modules that can be manually assembled and disassembled, wherein the magnetic modules consist in a bar-shaped element having a permanent magnet at each end, and an intermediate metallic plug adapted for short-circuiting the flux generated by the two magnets, thereby affording a sum of magnetomotive forces of the single modules along closed magnetic circuits, while constructing an assembly.

Even though similar magnetic modules for toy assemblies have allowed to obtain comparatively high anchoring forces and a good relationship between magnetic forces and weight of the assembly, if compared to the magnetic modules similar for example to the type described in DE3910304, they are permanently magnetized, so it is necessary to counteract the anchoring magnetic force to disassemble a part or the whole toy.

As regards applications requiring the use of magnetic modules capable of providing high anchoring magnetic forces, making it difficult, if not impossible, to assemble or disassemble them manually, EP 1399933, which represents the state of the art closer to the present invention, discloses a magnetic module provided with two anchoring magnetic heads structurally and functionally independent, joined by an intermediate tubular element, wherein each anchoring magnetic head comprises a multipolar stator and rotor configured to activate and deactivate the anchoring magnetic force by means of a polar inversion system that can be easily activated manually.

However, the magnetic module according to EP1399933, apart from being large and structurally complex, is completely unsuitable for applications requiring to actuate the two magnetic heads jointly or selectively in closed assemblies, acting from outside; it is furthermore difficult to associate a similar magnetic module to different types of assemblies, that can be used in different application fields.

OBJECT OF THE INVENTION

The main object of the present invention is to provide a magnetic module with a double anchoring face, that advantageously employs certain structural characteristics of the magnetic module according to EP1399933, that can be positioned in a closed space between two opposite assemblies, and that can be at the same time magnetically activated and deactivated acting from outside of the closed space or from a side of at least one of the two assemblies where the magnetic module is positioned.

A further object of the invention is to provide an anchoring magnetic module of the mentioned type, characterized by a simple structure, with consequent reduction of production costs, as well as suitable for being combined and employed with any type of assembly, in any field of application.

A further object of the invention is to provide a module with two anchoring magnetic faces anyhow oriented and configured, as well as suitable for providing a sum of the magnetic fluxes in the activated condition of the module and consequently a comparatively high anchoring magnetic force.

Another object of the invention is to provide an anchoring magnetic module having a high percentage of active magnetic area on each anchoring face, with respect to the overall surface area.

BRIEF DESCRIPTION OF THE INVENTION

In general, according to the present invention, a magnetic module has been provided suitable for disengageably anchoring, ferromagnetic workpieces constituting a part of an assembly, wherein the magnetic module comprises:

a first and a second fixed magnetic core in which each fixed magnetic core comprises a plurality of polar elements defining a front anchoring surface, and a rear surface axially spaced apart from the front surface, and a plurality of polarization permanent magnets disposed between contiguous polar elements; the front anchoring surface of each fixed magnetic core being magnetically activatable with a plurality of induced magnetic poles alternatively of opposite polarities, by a movable magnetic unit configured with a same plurality of permanent magnetic poles (30), alternatively of opposite polarities, a movable magnetic unit directly disposed between opposite rear surfaces of the first and second fixed magnetic core, and configured on each side facing the rear surface of a respective fixed magnetic core, with a plurality of permanent magnetic poles, alternatively of opposite polarities, corresponding to the plurality of the induced polar elements of the fixed magnetic cores;

the movable magnetic unit being supported to be moved between a first operative position for activating the magnetic module, in which each permanent magnetic pole of each polarity of the movable magnetic unit is aligned to a corresponding induced polar element of the fixed magnetic cores, having the same polarity as the corresponding permanent magnetic pole of the movable magnetic unit, and a second operative position for deactivating the magnetic module, in which each permanent magnetic pole of each polarity of the movable magnetic unit is aligned to a corresponding polar element, of the fixed magnetic cores, induced with an opposite polarity.

BRIEF DESCRIPTION OF THE DRAWINGS

These and other features of the anchoring magnetic module according to the present invention, and some preferred embodiments, will become more evident from the hereinafter description referring to the enclosed drawings, wherein:

FIG. 1 schematically shows two generic assemblies connected by means of an intermediate magnetic module;

FIG. 2 is a perspective view of a first embodiment of a six-pole magnetic module;

FIG. 3 is a perspective view of a tool suitable for activating and deactivating the magnetic module of FIG. 2;

FIG. 8 is a perspective view of the magnetic cores of the module of FIG. 7;

DETAILED DESCRIPTION OF THE INVENTION

Figure 4:
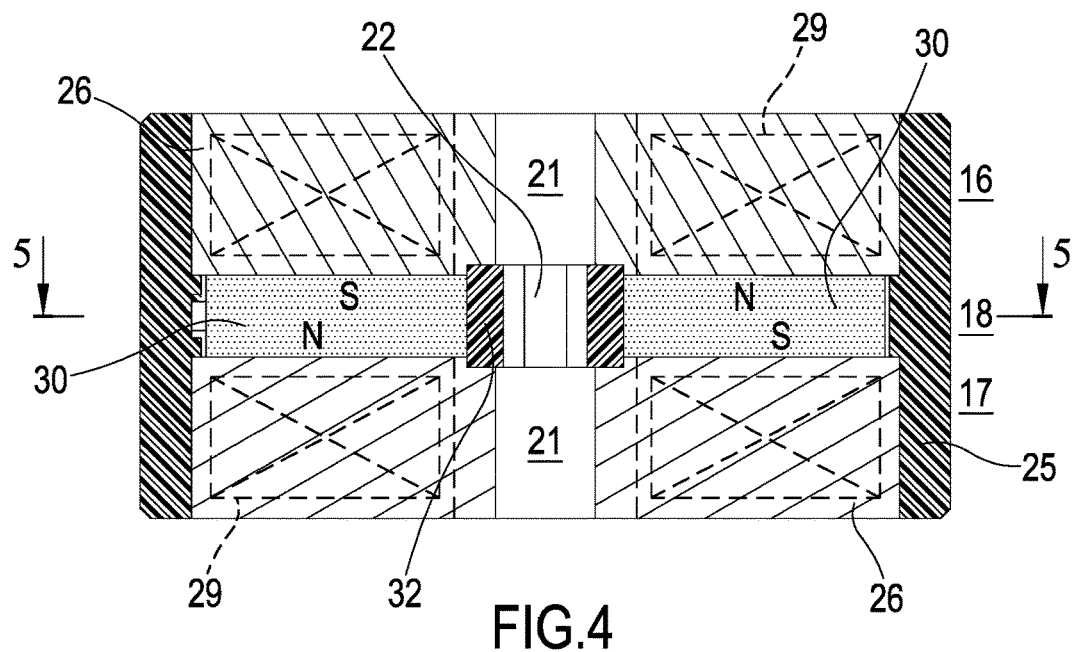
FIG. 4 is a cross sectional view according to line 4-4 of the module of FIG. 2.

Referring to FIGS. 1 to 6 and FIGS. 11 and 12 a first embodiment of the magnetic module according to the invention, and its functioning will be described.

FIG. 1 shows, for exemplary purposes, the use of a magnetic module 10 according to the invention to anchor two panels 11, 12 made of plastic, wood or other magnetically non-conductive material, or more generally two assemblies anyhow configured, wherein each panel or assembly 11, 12 comprises a magnetically conductive metal component, for instance a plate 13, 14 of iron material, fastened in any suitable way to a respective panel 11, 12 or other assembly component, for instance glued, fixed by means of screws or in other ways.

In the example of FIG. 1, the two plates 13, 14, or other metal component of the two assemblies, are housed in a corresponding seat; the metal plates, or metal components of the two assemblies could be differently configured and arranged.

FIG. 1 shows, always for exemplary purposes, a typical condition of use of a magnetic module according to the invention; as shown, the magnetic module 10 is positioned in the closed space 15 existing between the two panels 11, 12, or other type of assembly, which in an assembled condition makes the module 10 accessible only from outside through a hole in at least one of the two panels 11, 12, or assemblies. Therefore, as shown in FIG. 1 and as it will be described more in depth referring to the example of FIGS. 2-6, the magnetic module 10 comprises:

a first fixed magnetic core 16 magnetically anchored to the metal plate 13, or other metal element of a first assembly;

a second fixed magnetic core 17 magnetically anchored to the metal plate 14, or other metal element of a second assembly;

as well as comprises a third magnetic core 18, or more generally a movable magnetic unit, in an intermediate position between two fixed magnetic cores 16 and 17.

Figure 6:
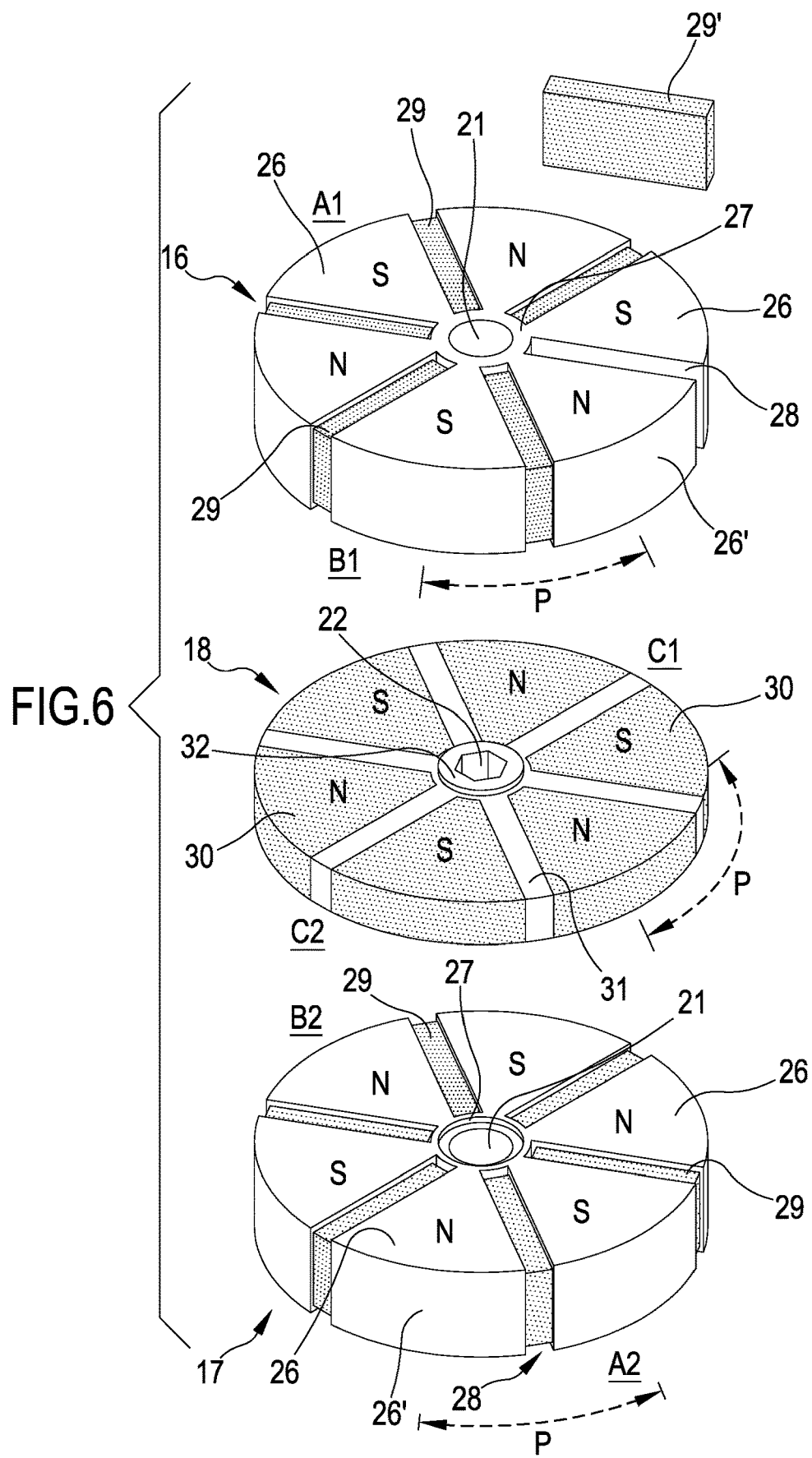
FIG. 6 is a perspective view of the magnetic cores of the module of FIG. 4.

As shown in FIG. 6, the two fixed magnetic cores 16, 17 and the movable core or magnetic unit 18 are configured and provided with a system of permanent magnets suitable to reverse the magnetic flux inside the module 10, to simultaneously activate and deactivate the two fixed cores 16 and 17 by means of a suitable angular movement of the intermediate core 18, or movable magnetic unit functionally equivalent, between two operative positions in a first one of which the magnetic module 10 is in a deactivated condition, such that to be easily positioned between the two panels 11, 12, or removed, while in a second operative condition of the intermediate core or movable magnetic unit 18, the module 10 is magnetically activated and magnetically anchored to metal plates 13, 14 of the two panels 11, 12 or equivalent assemblies.

In the example under consideration, the magnetic module 10 is schematically represented with the movable magnetic core 18, angularly rotatably supported between the two fixed magnetic cores 16, 17, as shown in FIGS. 2-6. Therefore, as shown in FIG. 1 one or both panels 11, 12 and one or both metal plates 13, 14, or equivalent assemblies, have holes 19, 20 axially aligned to corresponding holes 21 of one or both fixed magnetic cores 16, 17, respectively to the shaped hole 22, for example polygonal, of the movable magnetic core 18 or equivalent magnetic unit. Introducing from outside a tool end or other control device 23, for example of the type shown in FIG. 3, through the aligned holes 19, 20, 21 and 22 it is possible to mechanically engage the movable magnetic core 18 to angularly rotate between the two activation and deactivation operative positions of the magnetic module 10, always acting from outside. Thereby, the two panels 11, 12 or equivalent assemblies can be easily assembled and disassembled by activating and deactivating the module 10, with the possibility to reuse the same panels and the same magnetic module subsequently. In alternative to the manual control tool or device 23 it is possible to use an electromechanical control system.

In the example of FIGS. 2-6 it is shown a six-pole magnetic module, cylindrical- or circular-shaped, with two opposite anchoring faces; however, the specific shape of the magnetic module 10, its components and the number of magnetic poles of the two front faces of the module, can also change and be differently configured with respect to what shown.

In particular, the magnetic module of FIGS. 2-6 comprises an outer casing 25 consisting in a tubular body made of any type of magnetically non-conductive material having a circular or polygonal shape. Inside the tubular body 25 a first a one second fixed magnetic cores 16 and 17 are housed, opposite between them and fastened to the tubular body 25 in axially spaced apart positions. Between the two fixed magnetic cores 16 and 17 a movable magnetic core 18 is housed acting on which it is possible to magnetically activate and deactivate the anchoring module 10, as previously referred.

In the example under consideration, the fixed magnetic cores 16 and 17, hereinafter more simply referred to as "stators", are both disk shape configured having a prefixed diameter; the movable magnetic core 17, hereinafter also referred to as "rotor", intermediate between the two stators 16 and 17, is in turn disk-shaped having substantially the same diameter of the two stators 16 and 17, or slightly lower.

The two stators 16 and 17 are identically configured either mechanically and magnetically, with the difference that the stator 16 has a front anchoring surface A1, magnetically activatable an deactivatable, facing a face of the module 10, while the other stator 17 has a front anchoring surface A2 magnetically activatable and deactivatable, facing the other face of the module opposite to the previous one.

In particular, as shown in FIG. 6, the fixed magnetic core of each stator 16, 17 is configured with a plurality of polar elements 26, for example triangle-shaped, six in the case shown, wherein each polar element 26 has a substantially triangle shape similar to a circular sector, that radially extends from a central part 27 towards an outer edge 26', providing an angularly spaced arrangement between contiguous polar elements 26. Therefore, between contiguous polar elements 26 of each stator 16, 17 a corresponding number of radial cavities 28 delimited by plane lateral faces of two contiguous polar elements 26 is formed.

Each radial cavity 28 defines a housing seat for a corresponding permanent magnet 29, for example rectangularly-shaped or differently configured, one of which is indicated by 29' and it is shown in an extracted condition from a respective housing cavity 28.

The polar elements 26 of each stator 16, 17, in the example under consideration, define a flat-shaped front anchoring surface A1, A2, facing a respective outer face of the module 10, respectively define a flat-shaped rear surface B1, B2, facing the inside of the module 10, i.e. the central rotor 18.

The polar elements 26 of both stators 16 and 17 form magnetically induced poles by a first plurality of permanent magnets 29, with alternatively opposed polarities N, S, as shown. Always referring to FIG. 6, the polarization N, S of the polar elements 26 of a stator 16 is staggered of a polar pitch P with respect to that of the polar elements 26 of the other stator 17.

Figure 11:
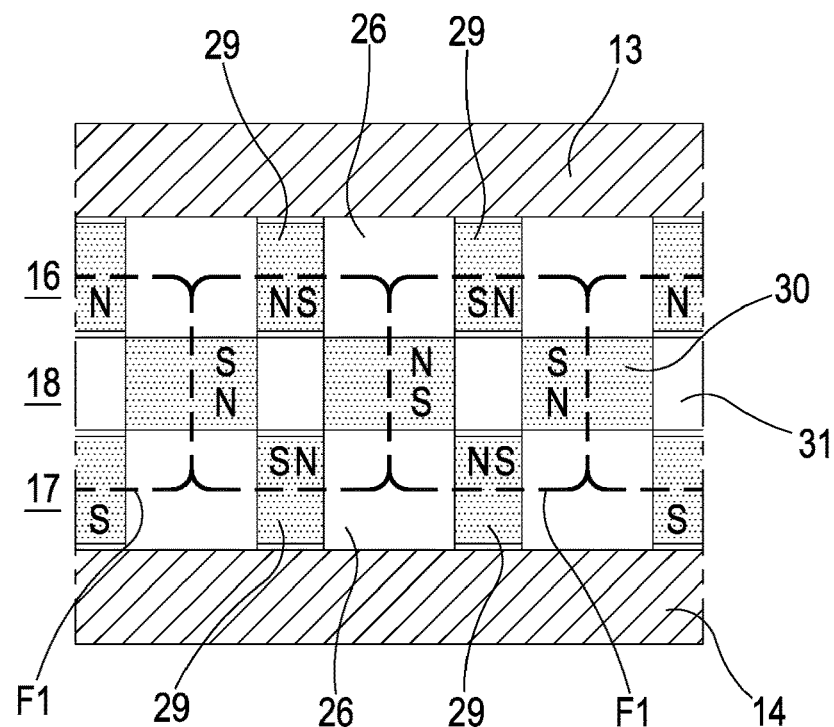
FIG. 11 schematically shows part of the magnetic circuit of the module of FIG. 4 and FIG. 9 in a deactivated condition.
Figure 12:
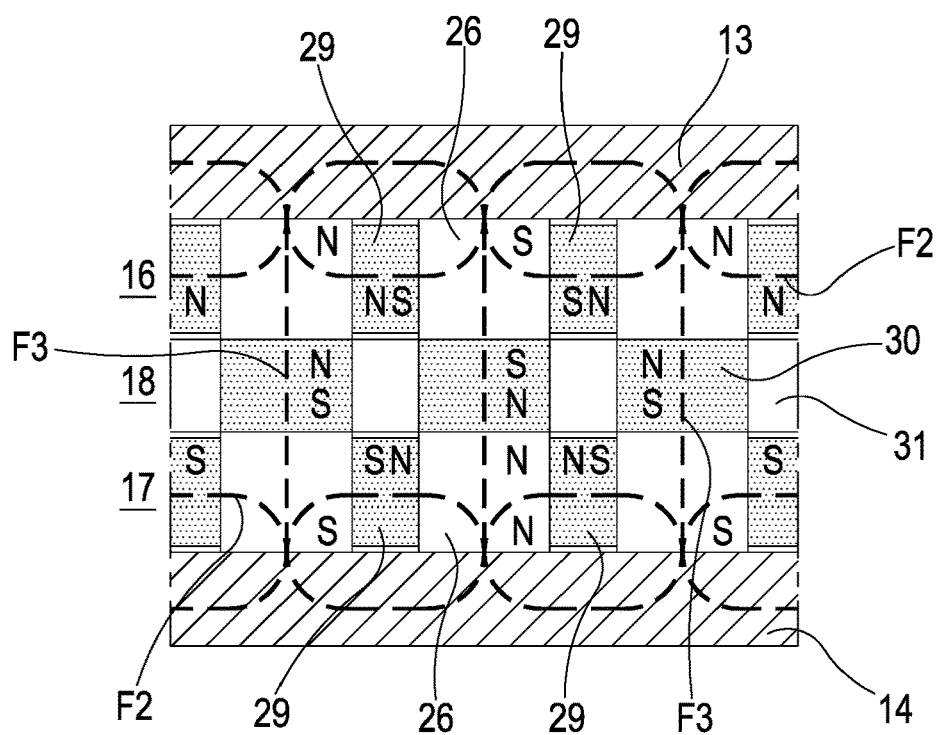
FIG. 12 schematically shows part of the magnetic circuit of the module of FIG. 4 and FIG. 9 in an activated condition.

Always referring to the example of FIGS. 2-6 and as clearly shown in the subsequent FIGS. 11 and 12, the plurality of polar elements 26 of each stator 16, 17 are alternatively magnetically induced with poles N, S by a correspondent plurality of permanently polarized magnets 29 such that both lateral faces of each polar element 26 of each polarity N and S, are in contact with a pole of corresponding polarity N and S of respective lateral permanent magnets 29. In other words each induced polar element 26 of the stators 16, 17 has flat lateral faces that are magnetically in contact with homonymous poles, of a same polarity N or S, of two lateral magnets 29 inserted in corresponding radial cavities 28.

Always referring to the example of FIGS. 2-6, similarly to the two stators 16 and 17 constituting the two fixed magnetic cores of the anchoring magnetic module 10, the movable unit or magnetic core too 18 consists in a disk-shaped rotor having a first flat polar face C1 facing the rear flat surface B1 of the stator 16, and a second flat polar face C2 facing the rear flat surface B2 of the other stator 17. The two polar faces C1 and C2 of the rotor 18 are both polarized with magnetic poles alternatively of opposite polarities N, S by a second plurality of permanent magnets 30, making sure that each magnetic pole N, S of each magnet 30 on one of the two polar faces C1, C2 corresponds to a magnetic pole of polarity S, N opposite to the previous one, of the same magnet 30 on the other polar face as indicated in FIGS. 11 and 12; in any case the number of poles of the rotor 18 must correspond to the number of induced poles of each of the two stators 16, 17.

In the specific case, the above is obtained by configuring the rotor 18 with a star-shaped structure, of magnetically non-conductive material, comprising a number of arms 31 radially protruding from a central part 32, between which a number of permanent magnets 30 corresponding to the number of induced poles 26 of each of the two stators 16 and 17 is fastened.

The rotor 18 can be supported to angularly rotate about a longitudinal axis of the module 10, in any way between the two stators, avoiding a frictional sliding between the two faces C1 and C2 of the rotor 18 and the rear surface B1, B2 of the two stators 16, 17, for instance interposing a thin layer of self-lubricant and anti-wear material (not shown).

In the example under consideration, the rotor 18, or more generally the movable magnetic core, can be controlled between two operative positions, spaced apart of a polar pitch P, in a first one of which it enables anchoring module 10, i.e. magnetically activates the front surfaces A1, A2 of the two stators 16, 17, while in a second operative position disables the anchoring module 10 magnetically deactivating the front surfaces A1, A2 of both stators 16, 17.

For exemplary purposes, the control system of the rotor 18 can be obtained by using a manual tool of FIG. 3, configured with ends 23A e 23B of different polygonal shape, each engageable and disengageable in a shaped hole 22 identically configured of the rotor 18, through an axially aligned hole 21 of one of the stators.

In alternative to the polygonal shape of the hole 22 of the rotor 18, and of the control tool 33, it is possible to provide the use of a toll with a different configuration, suitable to mechanically engage a hole identically configured of the rotor 18.

As it will be described in the following by referring to FIGS. 11 and 12, the total activation and deactivation of the magnetic module 10 occurs when poles N and S of magnets 30 of the rotor 18 are completely aligned to corresponding induced poles N, S of the polar elements 26 of the stators 16, 17, in two specific operative or angular positions.

Figure 5:
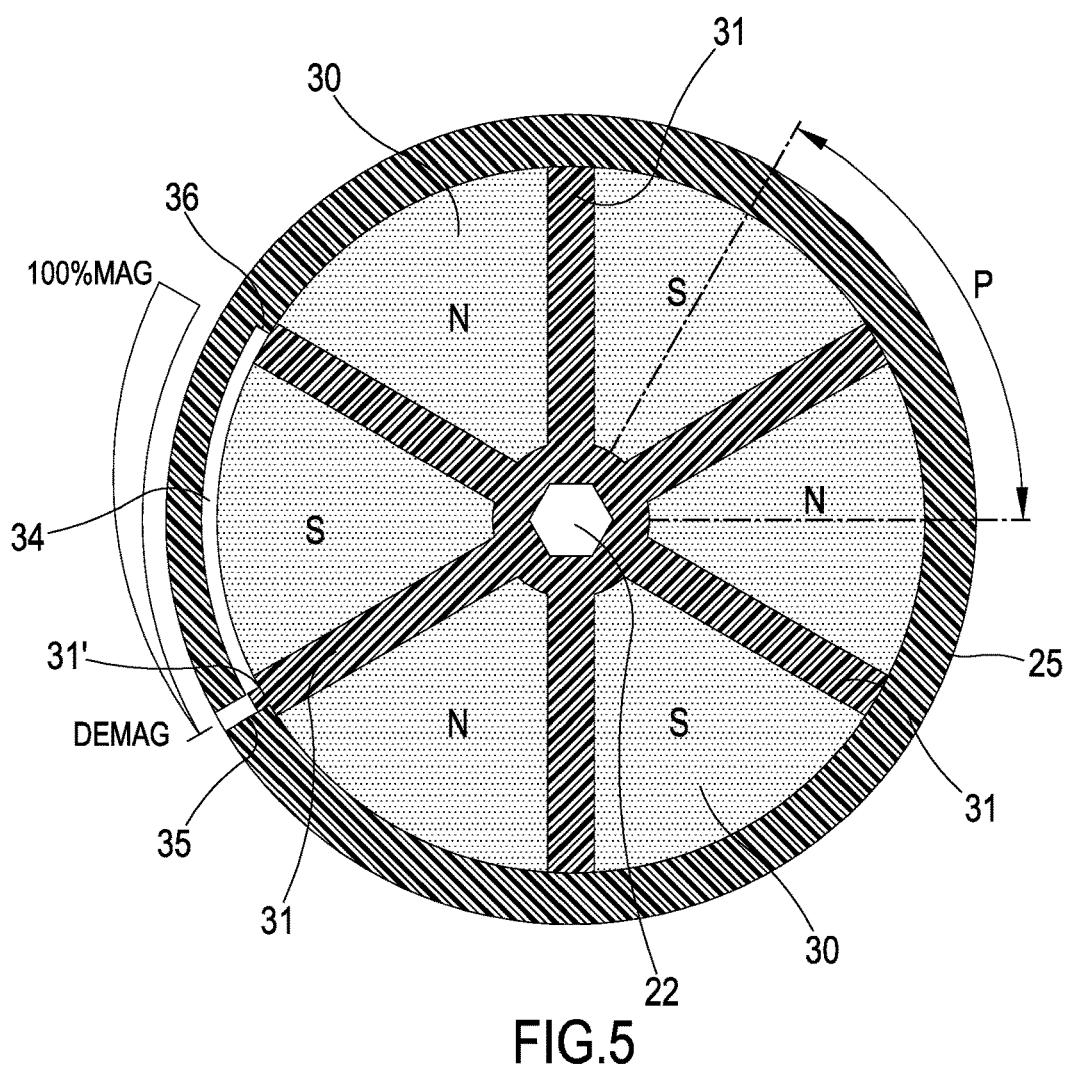
FIG. 5 is a cross sectional view according to line 5-5 of FIG. 4.

Therefore, the magnetic module 10 is provided with suitable stop means for stopping the rotor 18 in the two prefixed operative positions of FIGS. 11 and 12; for example, as shown in FIG. 5, one of the arms 31 of the rotor 18 has at its end a pin 31' slidable along an arc-shaped cavity 34 formed on the inner surface of the tubular casing 25; the cavity 34 is configured at one of its ends with a stop shoulder 35 and with a stop shoulder 36 at the end opposite to the previous one, at which complete deactivation (DEMAG), respectively complete activation (100% MAG) of the module 10, is obtained. By stopping the rotor 18 in an intermediate position between the two end stop positions 35, 36, a partial magnetization of the anchoring magnetic module is obtained, and consequently an anchoring magnetic force which progressively increases from DEMAG to 100% MAG.

Functioning

The functioning mode of the magnetic module 10 of FIGS. 2-6 can be explained by referring to the diagram of the magnetic circuit of FIGS. 11 and 12, wherein reference numbers and letters are the same as the ones used in the previous Figures, to indicate similar or equivalent parts.

FIG. 11 shows the magnetic module in a deactivated, or completely outwardly demagnetized state (DEMAG) and towards two ferromagnetic workpieces 13, 14 to be connected, while FIG. 12 shows the same magnetic module 10 in an activated, or completely outwardly magnetized state (100% MAG), and towards the two ferromagnetic workpieces 13, 14.

In particular, as shown in the demagnetized state of FIG. 11, each induced polar element 26 of the stator 16 and 17 is in contact both with homonymous poles of polarity N, S of respective lateral magnets 29, and with a magnetic pole of the rotor 18 of polarity S, N opposite to the polarity of the respective lateral magnets 29. In these conditions the polar elements 26 of the two stators 16 and 17 will only serve as a magnetic yoke for short-circuiting fluxes generated by various magnets 29, 30; thus fluxes will develop along a plurality of inner magnetic circuits F1 in equal number as the number of poles of each surface A1, A2 of stators 16, 17. The two anchoring faces of the module 10 will be thus neutral or totally demagnetized. Under these conditions the module 10 will be positioned between the two ferromagnetic elements 13, 14, or equivalent assemblies, respectively removed in an extremely easy way.

By contrast, FIG. 12 shows a totally activated condition of the magnetic module 10 after the angular rotation of a polar pitch P of the rotor 18, wherein the front surfaces A1 and A2 of the two stators 16, 17 are totally magnetized, and wherein the fluxes of magnets 29 of the stators 16, 17 and of magnets 30 of the rotor 18, develop along a plurality of magnetic circuits F2 e F3 that close externally with respect to the magnetic module, through the magnetic pieces to be anchored 13 and 14, which are thereby tightly magnetically anchored between them through the module 10. Preferably, the total magnetic flux of each magnet 30 of the rotor 18, must be equal to the flux generated by two lateral magnets 29 in contact with the lateral faces of each polar element 26.

The active condition of FIG. 12 occurs moving the rotor 18, or equivalent movable core, of a polar pitch corresponding to the distance between the axis of two contiguous polar elements 26 of the two stators 16, 17 corresponding to an identical polar pitch P of the rotor 18.

As now three faces of each polar element 26 of the two stators 16, 17 are in contact with homonymous poles of a same polarity N, S, in each polar element 26 a magnetic pole N or S of the same polarity will be induced; both opposite faces of the module 10 will therefore be magnetically active, making it possible to anchor the two ferrous pieces 13, 14.

In particular, as shown in FIG. 12, part of the magnetic flux generated by each magnet 29 inducing polar elements 26 of the two stators, develops along one first closed circuit F2 comprising two contiguous induced magnetic poles 26 and the intermediate magnet 29, as well as the relative ferromagnetic workpiece 13, 14 to anchor, by contrast, part of the magnetic flux generated by the two contiguous magnets 30 of the rotor 18, develops along a second closed circuit F3 comprising two contiguous induced polar elements 26 of the two stators, the corresponding permanent magnets 30 of the rotor 18 aligned at induced magnetic poles of the polar elements 26 of the two stators, and the two ferromagnetic pieces 13 and 14.

Thereby the two ferromagnetic pieces 13 and 14 will be anchored to the module by means of magnetic forces generated by the sum of the fluxes of each pair of closed magnetic circuits F2 and F3.

In FIGS. 2-6 a first embodiment of an anchoring magnetic module 10 is shown, wherein a movable magnetic unit disposed between two stators or functionally equivalent fixed magnetic cores is used, wherein the movable magnetic unit is composed of a single rotor or equivalent movable magnetic core.

The solution of FIGS. 2-6, apart from being characterized by a mechanical and magnetic structure easy to build, composed of few pieces and with a lower cost than previously known solutions, allows to simultaneously activate and deactivate, with a single operation both magnetic faces of the module, as previously described.

This solution in which a single rotor or equivalent movable magnetic unit is disposed between two stators or fixed magnetic cores, is extremely advantageous in that, apart from enabling to activate and deactivate the module simultaneously on both opposite faces, also allows to gradually adjust the anchoring magnetic force, from zero to a maximum allowed, stopping the rotor 18 in any intermediate condition among that of FIG. 11 (complete deactivation) and that of FIG. 12 (complete activation).

Furthermore, as already reported, while the two anchoring faces of the module 10 are being activated the intensity of the fluxes generated by the magnetomotive forces placed in series of all magnets along the closed magnetic circuits F2 and F3, sum up concentrating in the anchoring zones of the two ferromagnetic pieces 13, 14 or relative assembly.

Finally, in addition to the previously referred advantages, the magnetic module can be retractably inserted between two assemblies to be anchored, magnetically activating and deactivating acting from outside by means of a specific control system, for instance by means of the tool 30 insertable into axially aligned specific holes of at least one of the assemblies to be anchored, of at least one of the stators or fixed magnetic cores, and of the rotor or movable intermediate magnetic unit.

In order to prevent the body 25 supporting and housing the module 10 to move or rotate with respect to a housing seat in the two assemblies to be anchored during the steps of activating and deactivating steps, it is provided to configure the housing body 25 of the magnetic module 10 with a shape or suitable means to prevent its rotation; this can for example be obtained by configuring the external surface of the body 25 with one or more cavities or protruding parts 40 (FIG. 2) suitable to prevent a rotation of the module 10 during activation.

In the example of FIG. 2, in addition to the circular shape, the magnetic module 10 and the body 25 have front anchoring surfaces A1 and A2 of the stators, lying on planes parallel between them; however the magnetic module 10 and the relative body 25 could comprise anchoring faces differently configured, lying on differently oriented planes; for exemplary purposes, one or both anchoring faces of the module 10 could have semi-circular, spherical or polygonal shape, to fit to a coupling surface similarly configured of one or both assemblies to be anchored.

Other Embodiments

The following Figures show other embodiments of the magnetic module according to the present invention.

Figure 7:
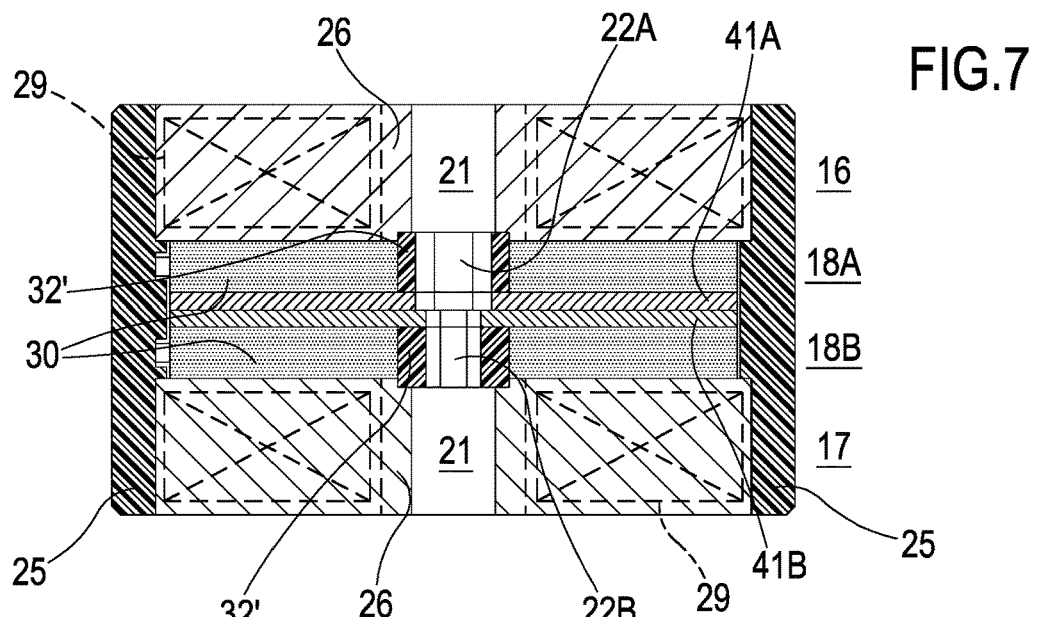
FIG. 7 is a cross sectional view similar to that of FIG. 5 relative to a second embodiment of the magnetic module.

In particular FIGS. 7 and 8 show a second embodiment of the magnetic module 10, wherein the movable magnetic unit for activating and deactivating the module is constituted by two magnetically linked rotors 18A and 18B, or equivalent movable magnetic core, identically configured, with the respective magnets polarized in opposite directions, towards the rear surfaces B1, B2 of the two stators 16, 17 or equivalent fixed magnetic cores.

In FIGS. 7 and 8 the same reference numbers of the previous Figures have been used, to indicate similar or equivalent parts.

Figure 13:
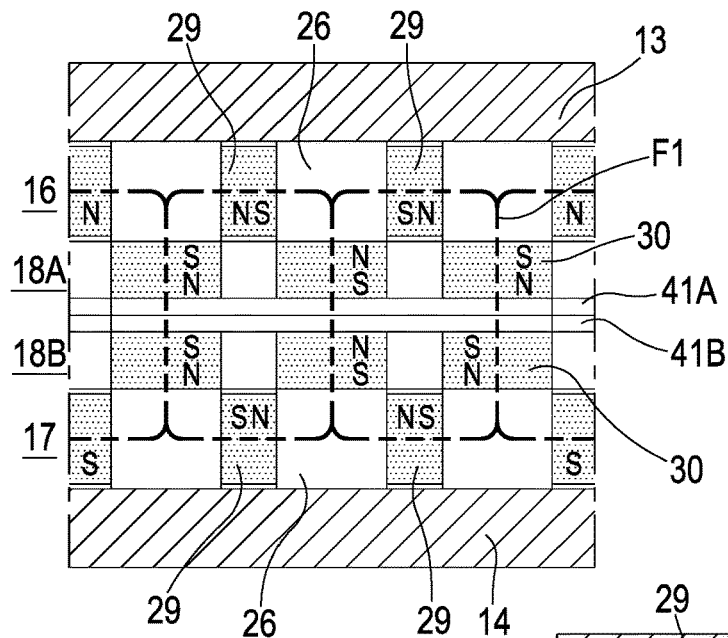
FIG. 13 schematically shows part of the magnetic circuit of the module of FIG. 7 and FIG. 10, in a deactivated condition.
Figure 14:
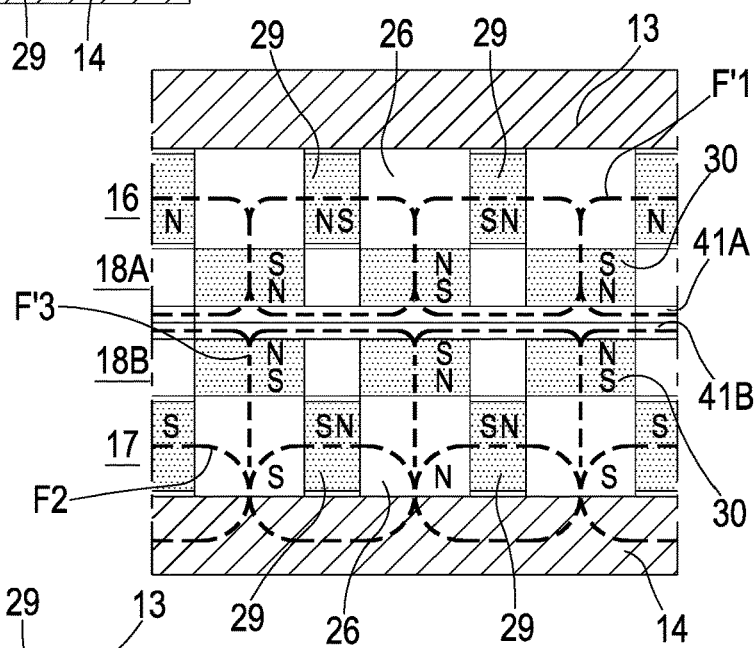
FIG. 14 schematically shows part of the magnetic circuit of the module of FIG. 7 and FIG. 10 with just one activated face.
Figure 15:
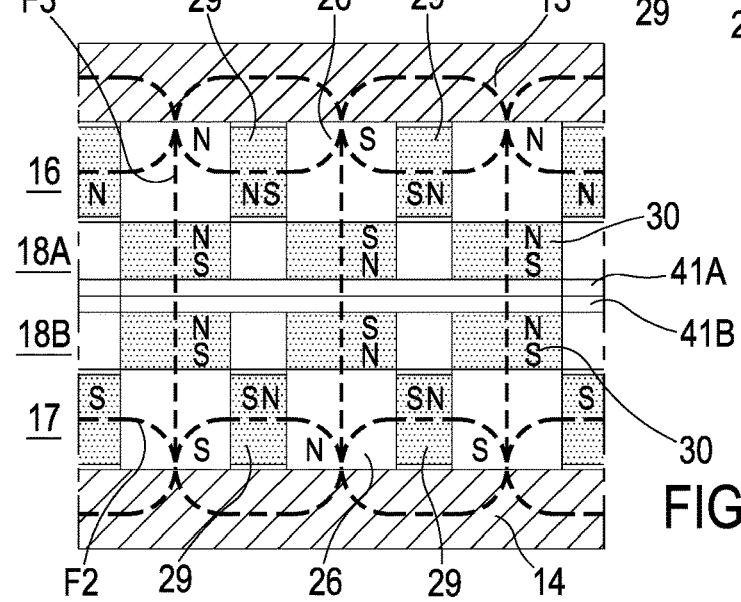
FIG. 15 schematically shows part of the magnetic circuit of the module of FIG. 7 and FIG. 10 in a totally activated condition.

FIGS. 7, 8 in combination with FIGS. 13-15, concern the solution of a magnetic module configured such as to make it possible to either activate and deactivate simultaneously the two faces of the module, as in the previous case, and to selectively and independently activate and deactivate a face of the module, with respect to the other anchoring face.

In this case also the magnetic module 10 is configured with a rotor unit, or movable magnetic core, disposed between and magnetically linked with two stators 16, 17, or fixed magnetic cores; this second solution differs from the previous one in that the movable magnetic unit comprises two rotors 18A and 18B magnetically linked or linkable between them, and with the two stators 16, 17, wherein each rotor 18A, 18B can be driven separately or together with the other rotor to magnetically activate and deactivate one or both anchoring faces of the module 10.

According to the example of FIGS. 7 and 8, the magnetic module 10 comprises again a circular- or polygonal-shaped tubular body 25, to house a first magnetic stator 16, respectively for housing a second magnetic stator 17 at all identical to magnetic stators 16 and 17 of the module 10 of FIGS. 2-6.

Each stator 16, 17 is again composed of a plurality of polar elements 26, with triangular shape, or circular sector, that radially extend from a central part 27; the polar elements 26 of the two stators 16, 17 are again alternatively polarized with poles N and S of opposite polarities by means of a first plurality of permanent magnets 29 configured and arranged with a same polarity N or S in contact of opposite faces of each polar element 26 of the stators.

Polar elements 26 of each of the two stators 16 and 17, similarly to the example of FIGS. 2-6 define again a respective front surface A1, A2 that can be magnetized, constituting one of the two anchoring faces of the module, and a rear surface B1, B2 as previously mentioned.

The magnetic module 10 of FIGS. 7 and 8 thus differs from the magnetic module 10 of FIGS. 2 and 4 in that the movable magnetic unit is now composed of a first rotor 18A in the form of a disk, and of a second rotor 18B in the form of a disk coaxial with the previous one.

The movable magnetic unit is configured with a plurality of magnetic poles alternatively of opposite polarities N and S, at the sides of both rotors facing the rear surface B1, B2 of a respective fixed magnetic core 16, 17.

In particular, each rotor 18A, 18B comprises a second plurality of permanent magnets 30 alternatively polarized with N and S polarity, with an axis of polarization parallel to the longitudinal axis of the module 10, coincident to the rotational axis for both rotors 18A and 18B. In this case also, the axis of polarization of the magnets 30 of the two rotors 18A, 18B, as in the previous case, is orthogonal to the axis of polarization of the magnets 29 of the two stators.

As in the previous example, the magnets 30 of the two rotors 18A, 18 and polar elements 26 of the two stators have an identical triangular or circular configuration; more in general they have a magnetic surface area anyhow configured, equal to that of the polar elements 26 of the two stators 16, 17 in order to optimize the magnetic behaviour of the anchoring module 10.

The example of FIGS. 7 and 8 further differs from the example of FIGS. 2-6 in that now the magnets 30 of each rotor 18A, 18B are fixed to a side face of a metal disk 41A, 41B in magnetically conductive material, representing a short-circuiting yoke for the fluxes generated by the magnets 30 of each rotor, in the deactivated conditions of one or both anchoring faces of the module 10, or constitute a portion of the magnetic circuits of the module 10 the partially or totally activated conditions, as hereinafter explained by referring to FIGS. 13-15.

In the example of FIGS. 7 and 8 the magnetic yokes 41A, 41B of the two rotors 18A, 18B are approached and magnetically linked between them in the activated condition of both faces of the module; furthermore the disks or yokes 41A, 41B structurally constitute an integral part of each rotor for supporting respective magnets 30 on the side facing the rear surface B1, B2 of the respective stator 16, 17.

In alternative to the two rotors each of which configured with a respective magnetic yoke 41A, 41B, similar functionality and operative independence of the two rotors are possible by means of other solutions. A first alternative solution provides to configure one of the two rotors with a magnetic yoke for short-circuiting and supporting magnets 30 of the same rotor, while the other rotor could be configured as the rotor 18 of FIG. 16, wherein the rotor is free from a magnetic yoke and wherein magnets 30 are fixed to the radial arms 31 of a supporting star-shaped structure. In this case the only magnetic yoke of one of the two rotors performs the same function of short-circuiting the fluxes performed by the two magnetic yokes 41A, 41B of the two rotors 18A, 18B of FIGS. 7 and 8.

A second alternative solution provides that the two rotors 18A, 18B are identically configured between them, with the magnets of each rotor supported by a star-shaped structure similarly to the rotor 18 of FIG. 6; however, in order to make it possible to selectively and independently activate each face of the magnetic module by activating one or the other one of the two rotors, it is necessary in this case to have a fixed intermediate magnetic yoke (not shown) that extends in a cross plane of the body 25.

The feature that distinguishes the module 10 of FIGS. 7-8 from the module 10 of FIGS. 2-6, consists in that, while for FIGS. 2-6 both front anchoring faces of the module are activated and deactivated simultaneously by means of the rotation of the single rotor 18, in the case of FIGS. 7 and 8 the two front anchoring faces of the module can be activated and deactivated both jointly and separately, selectively, by simultaneously or separately rotate the two rotors 18A, 18B.

Activation and deactivation of the magnetic module 10 can thus occur by rotating again of a polar pitch P, the one, the other or both rotors 18A, 18B, for instance acting always manually with a tool 33 properly configured, for example of the type shown in FIG. 3.

In this case the tool 23 must be configured with one first end 23A, with hexagonal shape adapted to engage with a correspondent hexagonal hole 22A of the first rotor 18A, axially aligned at a hole 21 of the stator 16; the tool 23 further comprises one second end 23B with polygonal shape and with cross dimensions lower than that of the polygonal end 30A, suitable for engaging a correspondent polygonal hole 22B of the other rotor 188, i.e. configured to engage simultaneously the polygonal holes 22A and 22B of both rotors 18A, 18B.

Functioning

The functioning mode of the magnetic module 10 of FIGS. 7 and 8 can be described by referring to the flux diagram of FIGS. 13-15, wherein:

a) FIG. 13 shows the path of the magnetic flux generated by the magnets 29 of the two stators 16, 17 and by the magnets 30 of the two rotors 18A, 18B, along a plurality of closed circuits F1 inside the module 10, in the deactivated or completely demagnetized condition of the two faces of the module, and wherein the polarities of the magnets 29, 30 have been again indicated by N and S. In this case each polar element 26 of each stator 16, 17 or fixed magnetic core, is again in contact with the poles of a same polarity N, S of the two magnets 29 lateral to each polar element 25 of that stator, while the same polar element 26 will be in contact with a pole of polarity S, N opposite to the previous one, of a respective magnet 30 of the rotor relative thereto, which is aligned in the deactivated condition to that specific polar element 26.

b) FIG. 14 shows the path of the magnetic flux generated by the magnets 29 of the two stators 16, 17 and by the magnets 30 of the two rotors 18A, 18B, along closed circuits F2, F'3 through the ferromagnetic piece 14 to be anchored, in the activated or magnetized condition of the module face 10 relative to the stator 17, the condition being obtained by means of the rotation of a polar pitch P of the rotor 18B only such that each polar element 26 of the stator 17 is polarized by homologous poles N, S of the magnets 29 and 30 facing the same polar element 26; by contrast F'1 indicates the magnetic circuits closed inwardly of the module 10, in the deactivated or demagnetized condition of the other anchoring face relative to the stator 16, the condition obtained by keeping the rotor 18A still in the condition shown in FIG. 13.

In this case as well in the ferromagnetic workpiece 14 we will have the sum of the fluxes generated by the magneto-motive forces in series of the magnets 29 and 30 relative to the stator 17 and relative to the rotor 18B.

c) FIG. 15 finally shows the active and totally magnetized condition of both the anchoring faces of the module 10 wherein the two rotors are magnetically linked a between them and to the two stators, by means of the single yoke or the ferromagnetic yokes of the two rotors; in this case the fluxes generated by the magnets 29 of the two stators 16, 17 and by the magnets 30 of the two rotors IA, 18B close along the magnetic circuits F2 and F3 as well as through the ferromagnetic pieces 13, 14 to be anchored, keeping the same arrangement of the poles and the sum of the fluxes shown for the circuits F2 and F3 of FIG. 14, or for circuits F3, F3 of FIG. 12.

The magnetized condition of FIG. 15 can either be obtained by rotating simultaneously the two rotors 18A, 18B of one pitch P, and selectively rotating of one pitch one rotor after the another one.

Figure 9:
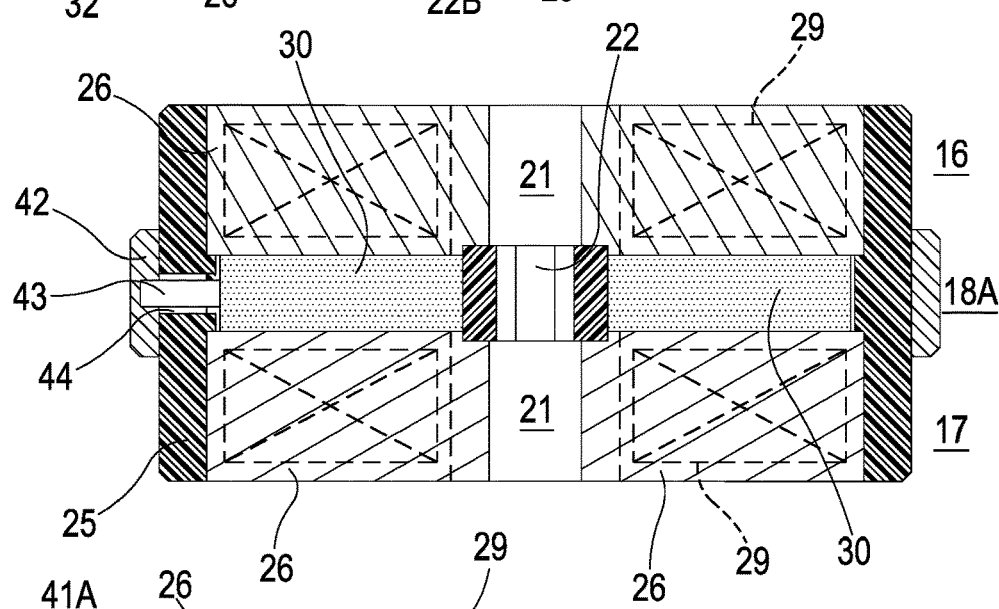
FIG. 9 is a cross sectional view similar to that of FIG. 4, relative to a third embodiment.

Also in the case of FIGS. 7 and 9 the module 10 will be provided with suitable means for stopping the rotation of the two rotors 18A, 18B in pre-set angular positions, similarly to what described in FIG. 5 for the rotor 18 of the previous example.

In the case shown in FIGS. 7 and 8, the two rotors 18A, 18B are axially approached with ferromagnetic yokes 41A, 41B magnetically linked between them, as shown.

A solution similar to the one of FIGS. 7, 8 is however possible wherein two rotors 41A, 41B are axially spaced apart between them, wherein each rotor 18A, 18B is again configured with a hole 22A, 22B axially aligned to an axial hole 21 of a respective stator 16, 17 to separately or jointly control a rotation thereof of a polar pitch P, by means of the tool 30, as previously described.

In this case, unlike the example of FIGS. 7, 8, each rotor 41A, 41B will act separately from the other rotor to cause a polar inversion of the fluxes in the activated and deactivated conditions of the anchoring magnetic module 10 between two or more assemblies.

Figure 10:
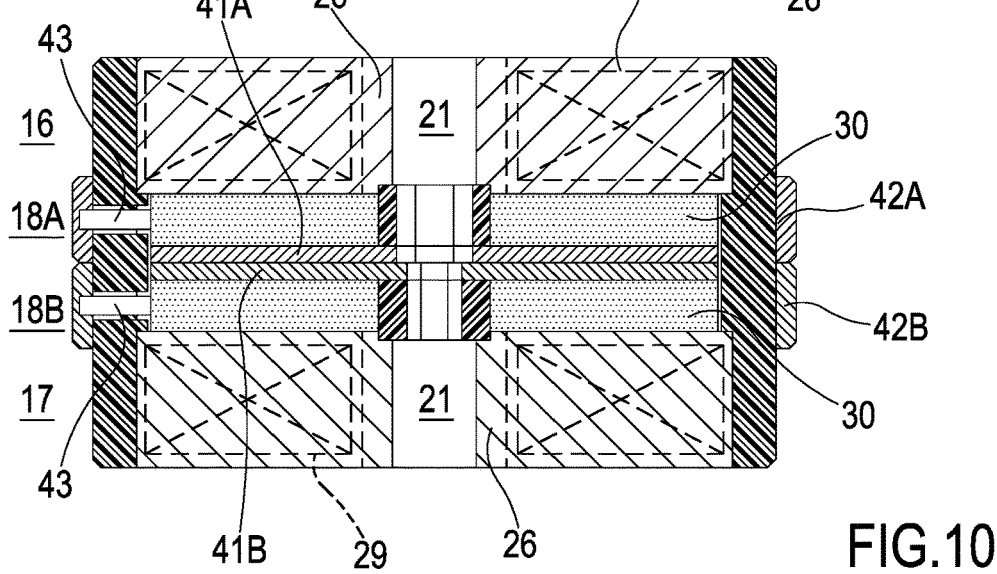
FIG. 10 is a cross sectional view similar to that of FIG. 7, for a fourth embodiment.

In the examples of FIGS. 2-6 and 7, 8 the control of the rotors 18, 18A and 18B is done manually acting by means of the tool of FIG. 3 that can be inserted into suitable central holes, axially aligned, of stators and rotors; however rotors could be controlled otherwise, by acting through specific control ring nuts; for example, with a single ring nut, as shown in FIG. 9 for a single-rotor magnetic module, similar to the one of FIG. 4, respectively with two ring nuts as shown in FIG. 10 for a double-rotor magnetic module, similar to that of FIG. 7.

Again in FIGS. 9 and 10 the same reference numbers of the previous Figures have been used, to indicate similar or equivalent parts.

Referring specifically to FIG. 9, relative to the module 10 with single rotor 18, the cylindrical body 25 of the magnetic module 10 is provided with a rotatable ring nut 42 connected by means of a pin 43 to one of the arms 31 of the star-shaped structure of the rotor 18; the pin 43 radially protrudes through an arc-shaped slot 44 of the body 25, that extends angularly substantially of a polar pitch P, such that the rotor 18 can be moved and rotated between a first operative position of complete demagnetization (DEMAG), and a second operative position of complete magnetization (100% MAG). The control nut ring 42 can be provided alternatively or in combination with control central holes 21, 22 of the rotor.

FIG. 10 shows by contrast the use of two independent control ring nuts 42A, 42B for the two rotors 18A, 18B of the magnetic module 10 of FIGS. 7, 8; again in FIG. 10 the same reference numbers of the previous Figures are used to indicate similar or equivalent parts. Each ring nut 42A, 42B is connected to the respective rotor by a pin protruding from a respective arc-shaped slot, equally to FIG. 9.

In the previous examples of FIGS. 7-9, 13-15, the two rotors 18A and 18B, or in general the two parts composing the movable magnetic unit, are equally configured with magnets positioned on the side of the magnetic yoke facing the respective stator or fixed magnetic core, furthermore the two rotors o equivalent parts of the movable magnetic structure are tightly approached and magnetically linked between them.

According to a further alternative solution, one of the magnetic rotors can be configured in the same way as the magnetic rotor 18 of FIG. 4, 6 with no short-circuiting yoke, while the other one of the magnetic yokes can be configured in the same way as one of the rotors 18A, 18B of FIGS. 7, 8, including the magnetic yoke for short-circuiting fluxes.

According to a further alternative solutions, the two magnetic rotors 18A, 18B can be configured in the same way as the magnetic rotor 18 of FIG. 4, i.e. with no yoke for short-circuiting fluxes, providing in this case a fixed magnetic yoke in an intermediate position between the two rotors, fixed to the external casing 25 of the module 10.

FIGS. 16-19 show another solution of an anchoring magnetic module similar to the one of FIGS. 2-6 and FIGS. 7, 8, suitable for reducing the thickness of the stators, and consequently of the same anchoring magnetic module, keeping an anchoring magnetic force comparatively higher, suitable for preventing losses of flux along the peripheral edge of stators; again the same reference numbers have been used as in the previous Figures to indicate similar or equivalent parts.

In this regard, it is preferable that the magnet surfaces that are in contact with each polar element of the stators be proportional to the surface of the single magnet of the rotor. In any case, as it is preferable in general that the total magnetic flux generated by each single magnet of the rotor (i.e. the intensity of the flux of each single magnet, multiplied by the monopolar area of the magnet itself) corresponds to the total magnetic flux generated by magnets in contact with a same polarity to a same induced polar element of the stators, considering also that the thickness or the magnetic length of the magnets determines the installed magnetomotive force, it derives that in case of anchoring magnetic modules with a limited number of poles, for example 2 or 4 magnetic poles, it would be necessary to significantly improve the thickness of the stators and consequently of respective magnets, to balance the surfaces between the magnets of the rotor, or of the rotors, and of the magnets of the stators.

Figure 16:
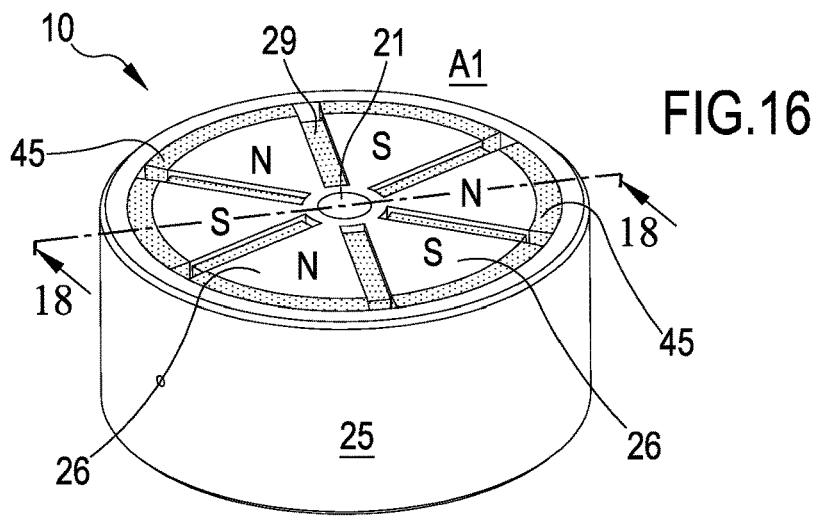
FIG. 16 is a perspective view of a fifth embodiment of a magnetic module similar to that of FIG. 2.
Figure 17:
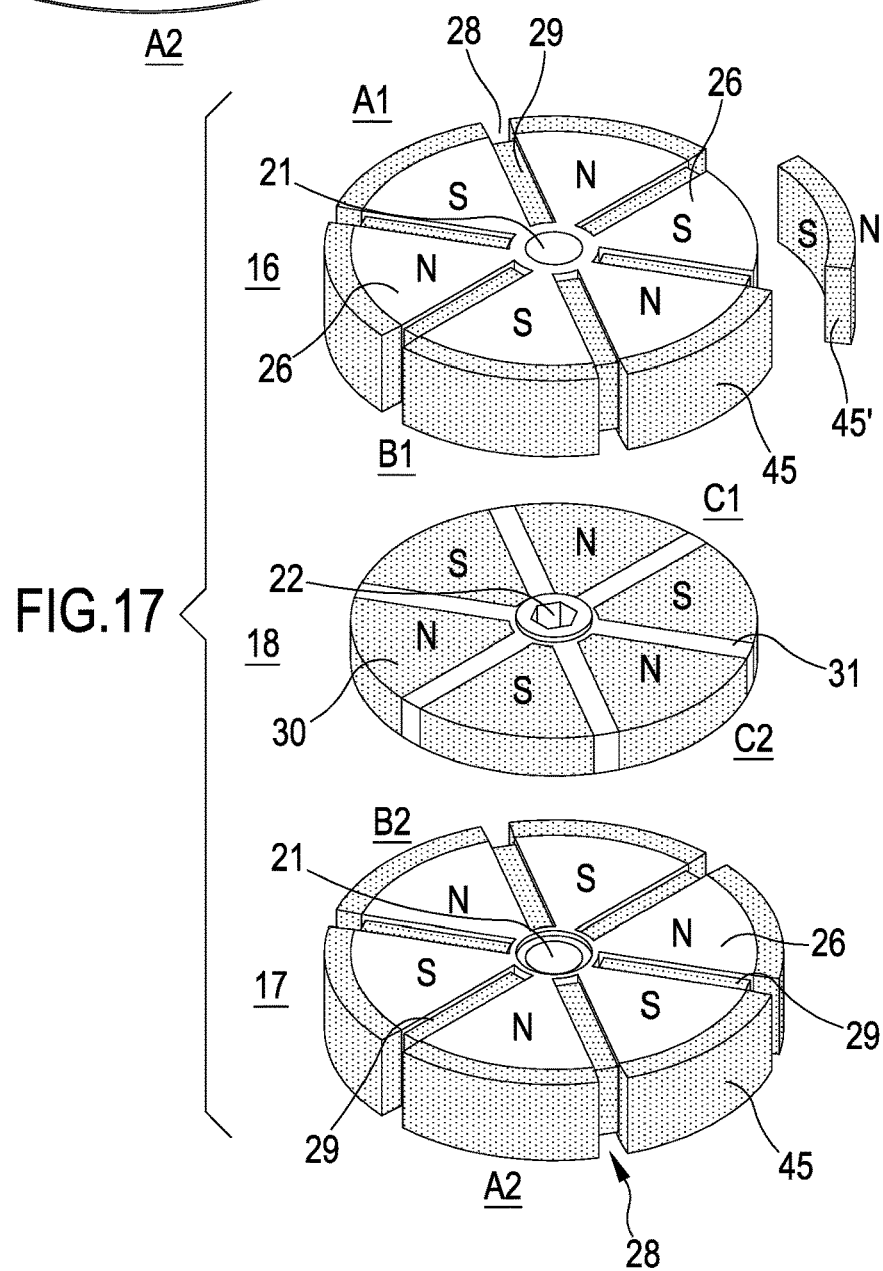
FIG. 17 is a perspective view of the magnetic cores of the module of FIG. 16.
Figure 18:
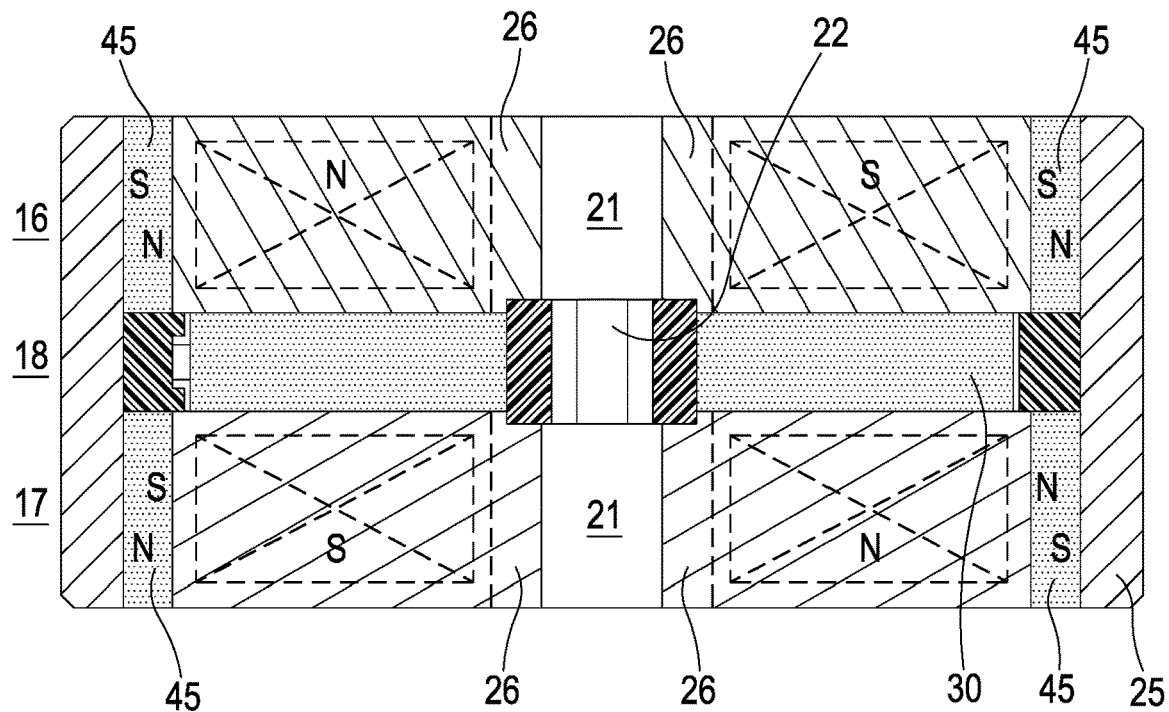
FIG. 18 is a cross sectional view according to line 18-18 of the module of FIG. 16.
Figure 19:
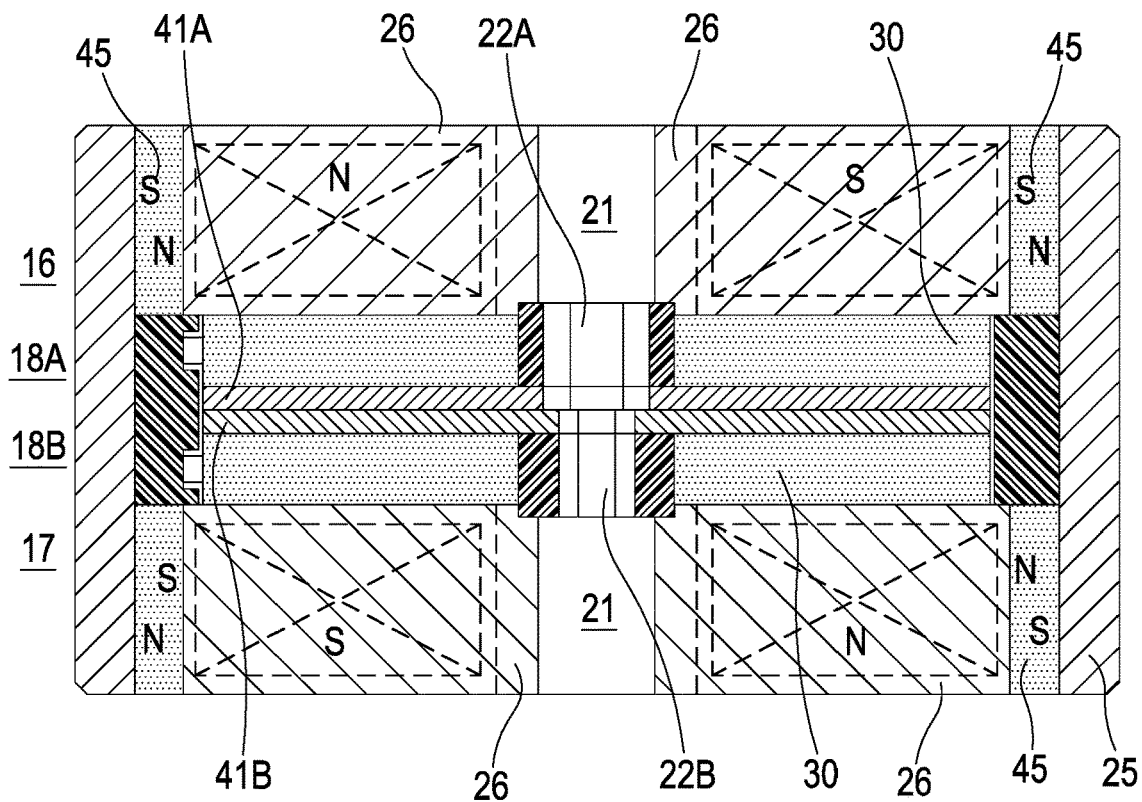
FIG. 19 is a cross sectional view similar to that of FIG. 18 for a sixth embodiment.

In FIGS. 16-18 for the module with a single rotor, and in FIG. 19 for the module with a double rotor, a further peripheral magnet 45 is inserted between each polar element 26 of the stators 16, 17 and the outer casing 25, always keeping an adequacy condition between the polarities of the magnets in contact of each single polar element 26 in the two activated and deactivated conditions.

This solution is schematically indicated in FIGS. 16-18 for the magnetic module 10 with a single rotor 18, and in FIG. 19 for the magnetic module 10 with two rotors 18A, 18B, where the same reference numbers and letters of the previous Figures have been used again, to indicate similar or equivalent parts.

In these two cases too, as shown for the magnet 45' in FIG. 17, each peripheral magnet 45 must have the face in contact with the outer edge of the respective induced polar element 26, polarized with the same polarity N, S of the two lateral magnets 29 relative to the same polar element.

However, in this case it is necessary to provide a magnetic yoke for short-circuiting the fluxes, between contiguous peripheral magnets 45. For example the outer casing 25 can be made of ferromagnetic material or can have inserts of ferromagnetic material (not shown) adapted to form a yoke for short-circuiting fluxes between contiguous peripheral magnets 45; furthermore, in case flat-shaped peripheral magnets 45 are used, the inner surface of the housing casing 25 of the magnetic module will have to be polygonal-shaped, i.e. delimited by corresponding planar surfaces for short-circuiting fluxes, according to the number of magnetic poles.

Up to now a cylindrical shape of the anchoring magnetic module has been described, comprising two disk-shaped stators, delimited by two planar or flat end surfaces, orthogonal to the longitudinal axis of the module itself, coincident with the rotational axis of one or two rotors. Thus, the anchoring magnetic surfaces defining the two faces of the magnetic module extend according to two parallel planes. It is however possible to conform and/or differently orient the anchoring surfaces of the two faces of the module, suitably conforming the two stators. For example, the front anchoring surfaces of the two faces of the magnetic module could again be planar or flat surfaces lying on planes forming any angle between them. By contrast, the anchoring surface of one or two of the faces of the module, could be differently shaped, if compared to the other one, for example with an arc, partially spherical, polygonal shape or of any other type, to contact a surface similarly conformed of a ferromagnetic piece, or assembly to be anchored.

According to a further embodiment, always attributable to the diagrams of the magnetic circuits of the previous Figures, the magnetic module 10 could have a linear configuration, rather than a cylindrical or polygonal configuration, with fixed and movable magnetic cores having circular shape; in this case the two fixed magnetic cores and one or two movable magnetic cores in form of sliders, would parallely extend between them keeping an alternate configuration of the polarity N and S of the poles of each fixed and movable magnetic core, in a way substantially similar to the magnetic configuration described for the modules of FIGS. 11, 12 and FIGS. 12-15.

This solution is useful and advantageous where it is required to have magnetic modules for anchoring elongated ferromagnetic pieces or assemblies, i.e. to have several anchoring zones varyingly positioned on a same face, or on both faces of the module.

Possible Uses

Anchoring magnetic modules of the type described are particularly suitable in all those applications where it is required to rapidly assemble and disassemble any type of assembly, acting from outside of the assembly thereof.

Examples of possible uses are in the furniture, architecture or stand-space sectors, for removably fitting panels, floors and for making partition walls, as well as for any other useful application.

As previously mentioned, the invention relates to a specific type of anchoring magnetic module, activatable and deactivatable to disengageably anchor separate parts of any type of assembly; however, an object of the present invention is also any assembly of parts or elements that can be anchored by magnetic modules of the type described, as well as a kit comprising one or a plurality of anchoring magnetic modules according to the invention, of the same type or of a different type; for example the kit could comprise a plurality of magnetic modules of the single-rotor type, two-rotor type, or equivalent magnetic units, i.e. it could comprise two or more pluralities of magnetic modules or equivalent magnetic units of different type, identically or differently configured, or a combination thereof.

The invention claimed is:

1. A magnetic module suitable for disengageably anchoring ferromagnetic pieces constituting part of an assembly, wherein the magnetic module comprises:
    a first and a second fixed magnetic core in which each fixed magnetic core comprises a plurality of polar elements defining a front anchoring surface, and a rear surface axially spaced apart from the front anchoring surface, and a plurality of polarization permanent magnets disposed between contiguous polar elements; the front anchoring surface of each fixed magnetic core being magnetically activatable with a plurality of induced magnetic poles alternatively of opposite polarities (N, S), by a movable magnetic unit configured with a same plurality of permanent magnetic poles, alternatively of opposite polarities (N, S),
    a movable magnetic unit directly disposed between opposite rear surfaces of the first and second fixed magnetic cores, and configured on each side facing the rear surface of a respective fixed magnetic core with a plurality of permanent magnetic poles, alternatively of opposite polarities, corresponding to the plurality of induced polar elements of the fixed magnetic cores;
    the movable magnetic unit being supported to be moved between a first operative position for activating the magnetic module, in which each permanent magnetic pole of each polarity (N, S) of the movable magnetic unit is aligned to a corresponding induced polar element of the fixed magnetic cores having a same polarity (N, S) as a corresponding permanent magnetic pole of the movable magnetic unit, and a second operative position for deactivating the magnetic module, in which each permanent magnetic pole of each polarity (N, S) of the movable magnetic unit is aligned to a corresponding polar element, of the fixed magnetic cores induced with opposite polarity.

2. The magnetic module according to claim 1, wherein each permanent magnetic pole of the movable magnetic unit, in the first operative position, is totally or partially alignable to a corresponding induced polar element of the fixed magnetic cores.

3. The magnetic module according to claim 1, wherein each fixed magnetic core comprises a plurality of induced polar elements, and a plurality of permanent magnets, in which opposite sides of each induced polar element are in contact with poles of permanent magnets both having a same polarity (N, S) facing the polar element.

4. The magnetic module according to claim 3 wherein, in the first operative position of the movable magnetic unit, fluxes generated by the permanent magnetic poles of the movable magnetic unit are summed to fluxes of the permanent magnets of the fixed magnetic cores.

5. The magnetic module according to claim 1, wherein the movable magnetic unit is configured as a rotor unit rotatably supported with respect to the fixed magnetic cores, between the first and second operative positions.

6. The magnetic module according to claim 5, wherein the rotor unit consists of a single rotor having opposite sides, each side facing the rear surface of a respective fixed magnetic core, and a plurality of permanent magnets having on each side magnetic poles alternatively of opposite polarities (N, S), facing a respective rear surface of the fixed magnetic cores.

7. The magnetic module according to claim 6, wherein the rotor comprises a shaped hole engageable with a control tool, and in which the shaped hole is axially aligned to a hole of one or both the fixed magnetic cores.

8. The magnetic module according to claim 6, wherein the single rotor of the rotor unit is operatively connected to a peripheral control ring nut.

9. The magnetic module according to claim 5, wherein the rotor unit consists of a first and a second rotor each configured with a plurality of permanent magnets having magnetic poles (N, S) alternatively of opposite polarities facing a respective rear surface of each of the fixed magnetic cores and wherein at least one magnetic yoke is disposed between the two rotors.

10. The magnetic module according to claim 9, wherein one or both the rotors comprise a respective magnetic yoke for circuiting fluxes, on a side facing the other one of the rotors.

11. The magnetic module according to claim 9, wherein the magnetic yoke is fixedly supported and disposed between the two rotors.

12. The magnetic module according to claim 9, wherein one of the rotors is provided with a shaped control hole differently configured from a shaped control hole of the other rotor.

13. The magnetic module according to claim 12, wherein the rotors are drivable, jointly or separably, between a first and a second angular position for activation and deactivation the module.

14. The magnetic module according to claim 9, wherein each of the first and second rotors of the rotor unit is operatively connected to a peripheral control ring nut.

15. The magnetic module according to claim 5, wherein the rotor unit consists of a first and a second rotor, axially spaced apart from one another, each configured with a plurality of permanent magnets having magnetic poles (N, S) alternatively of opposite polarities facing a respective rear surface of the fixed magnetic cores, and in which each rotor is configured with a differently shaped hole, axially aligned to a hole of one or both of the fixed cores.

16. The magnetic module according to claim 1, wherein the movable magnetic unit is configured as a slidable unit in an axial direction of the fixed magnetic cores, between the first and second operative positions.

17. The magnetic module according to claim 1, comprising stop members for stopping the movable magnetic unit in the first and in the second operative positions.

18. The magnetic module according to claim 1, wherein induced polar elements of the fixed magnetic cores and the permanent magnets of the movable magnetic unit have a triangular or a circular sector configuration.

19. The magnetic module according to claim 1, wherein each induced polar element of the fixed magnetic cores is magnetically in contact with a first and a second lateral polarization magnet, respectively with a third peripheral polarization magnet, along an outer edge of each induced polar element, and wherein the first and second lateral polarization magnets and the peripheral magnet have magnetic poles having a same polarity (N, S) in contact with the polar elements.

20. The magnetic module according to claim 1, wherein a total magnetic flux generated by each permanent magnet of the movable magnetic unit, corresponds to a total magnetic flux generated by the permanent polarization magnets of each polar element of the first and second fixed magnetic cores.

21. The magnetic module according to claim 1, comprising:
an external tubular casing;
a first and a second fixed magnetic core of circular or polygonal shape, axially spaced apart from one another and positioned at opposite ends of an outer casing; and
a movable magnetic unit comprising at least one disk-shaped rotor element in an intermediate position between the first and the second fixed magnetic cores;
the rotor element being configured with at least one central shaped hole, suitable for being engaged by a control member, wherein the central shaped hole of rotor element is axially aligned to a central hole of the first and/or of the second fixed magnetic cores.

* * * * *